Figure 1:
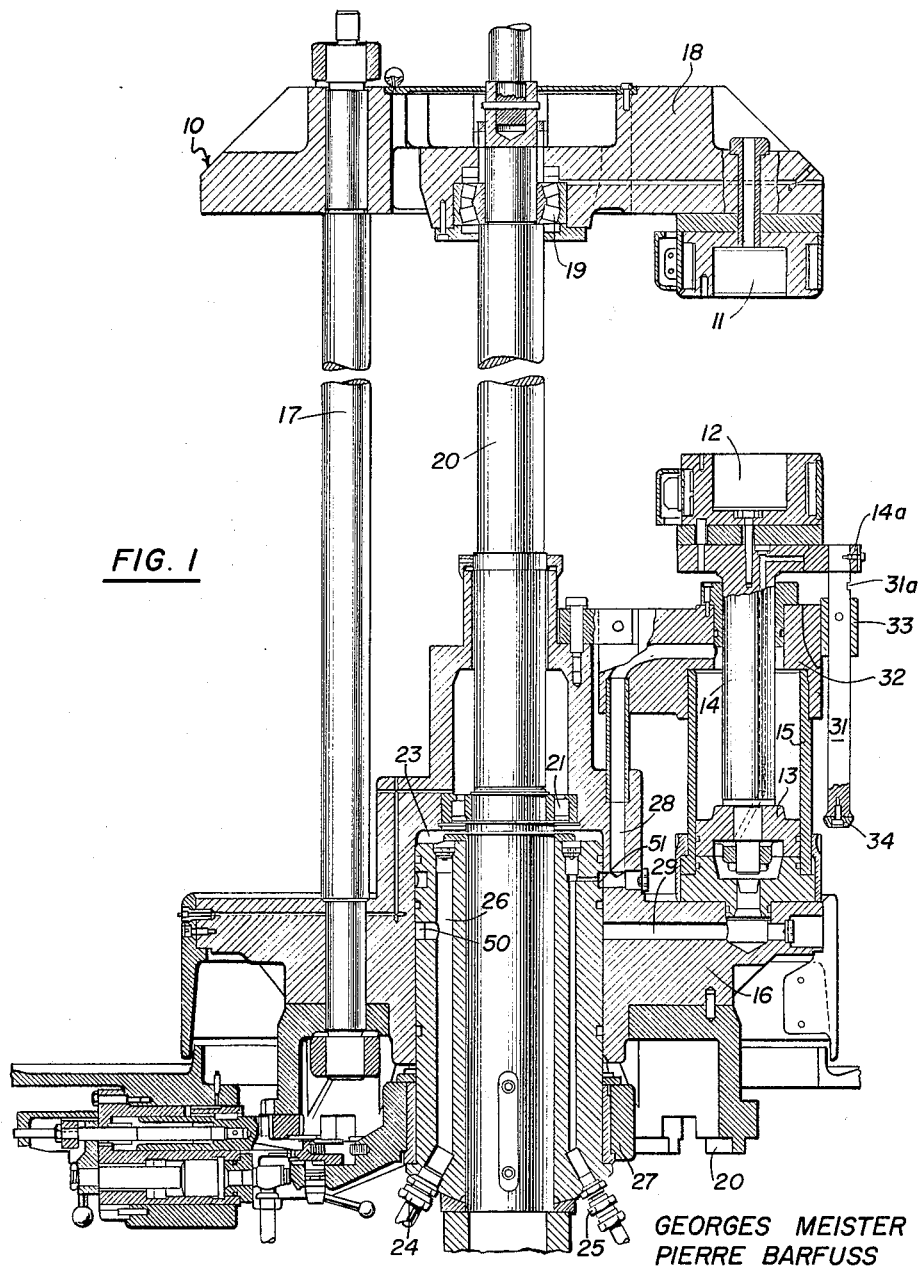

FIG. I

GEORGES MEISTER
PIERRE BARFUSS
INVENTORS.

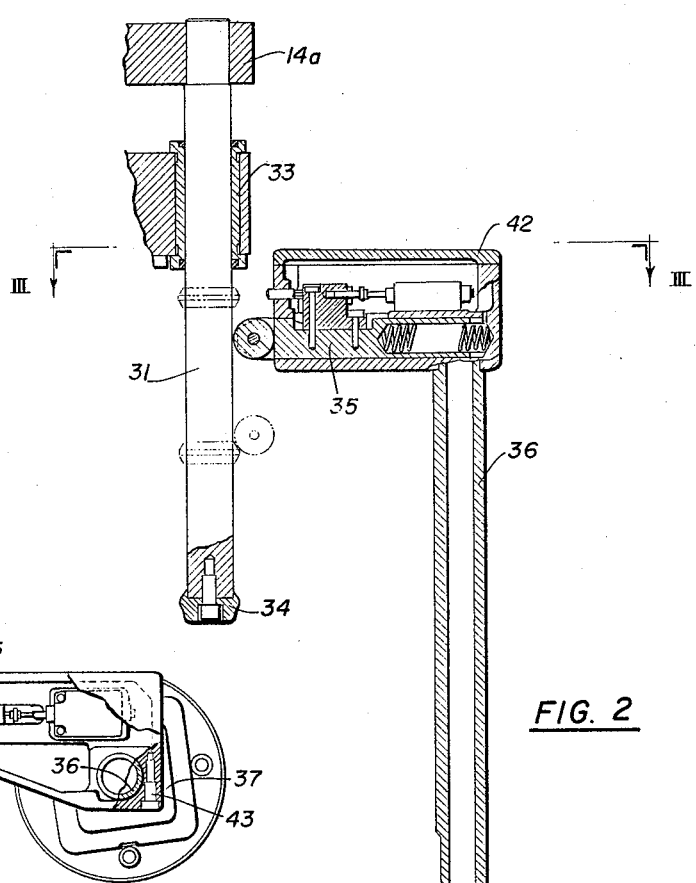
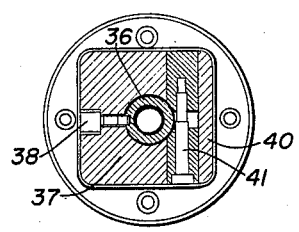
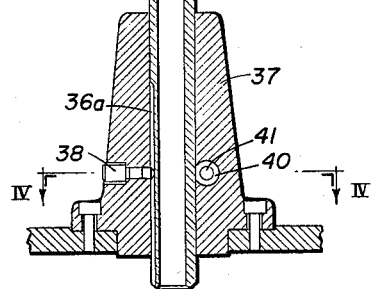
FIG. 2
FIG. 3
FIG. 4
GEORGES MEISTER
PIERRE BARFUSS
INVENTORS.

GEORGES MEISTER
PIERRE BARFUSS
INVENTORS.

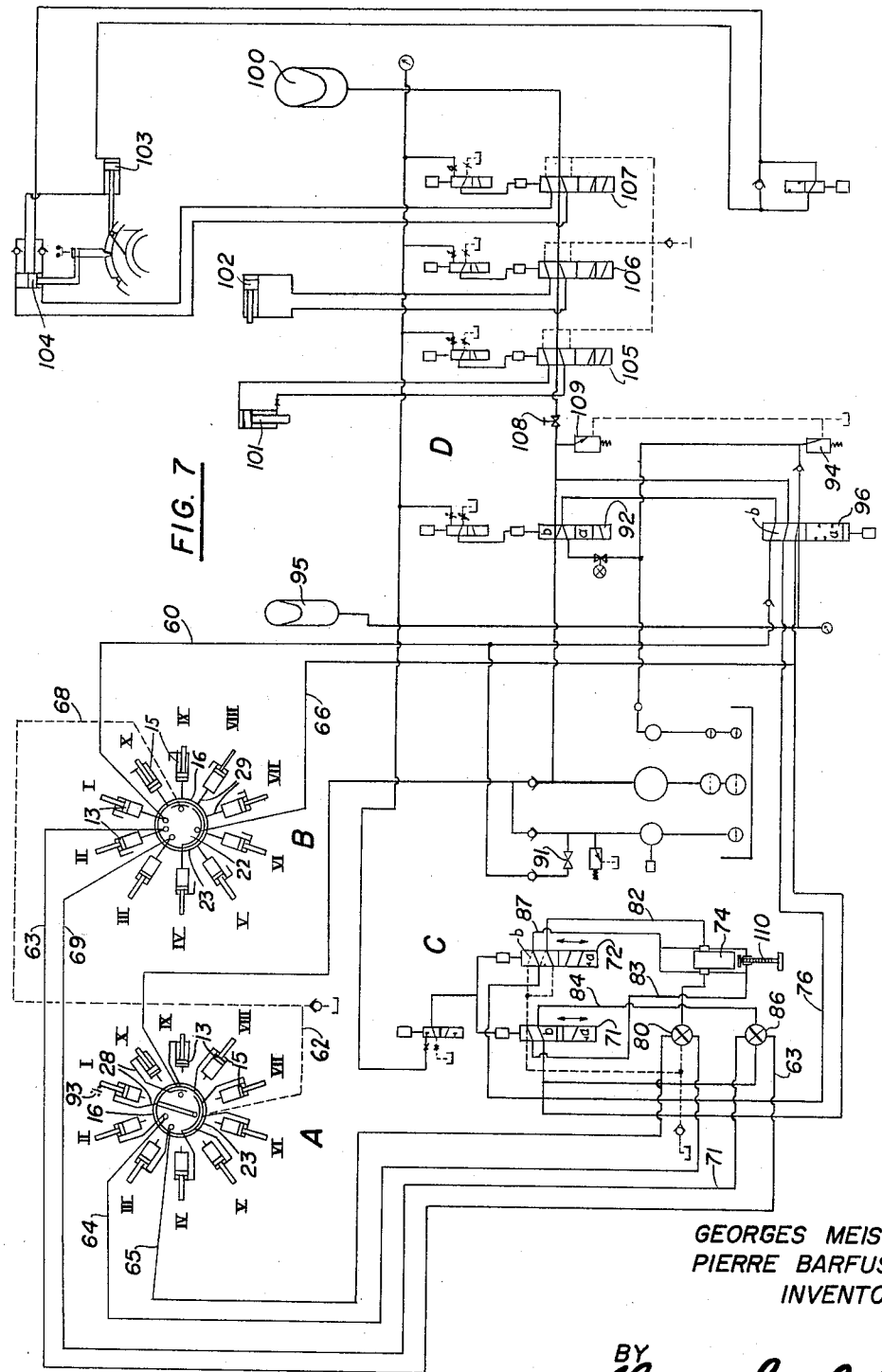

United States Patent Office 3,277,533
Patented Oct. 11, 1966

3,277,533
APPARATUS FOR MOLDING PLASTIC ARTICLES
Georges Meister and Pierre Barfuss, Tavannes, Switzerland, assignors to Tavannes Machines Co. S.A., Tavannes, Switzerland, a corporation of Switzerland
Filed Apr. 24, 1963, Ser. No. 275,465
Claims priority, application Germany, Apr. 28, 1962, T 22,042
6 Claims. (Cl. 18—20)

This invention relates to apparatus for molding plastic articles and, more particularly, a multistation rotary machine for molding plastic or the like under high pressure.

It is common practice to form articles from plastic which is in the form of granules, beads, or tablets. This is in contrast to those methods in which the plastic is injected in molten liquid form. In using plastic beads, the material to be formed is introduced into a two-part, enclosed-cavity mold and is then subjected to extremely high pressure, i.e., in the order of 12 atmospheres. Furthermore, this high pressure must be maintained for a relatively long period of time. Because of this long cycle time, a considerable number of molds are necessary to achieve a high rate of production. Generally speaking, machines for this purpose are of the type in which the molds are mounted on a rotary carrier and a hydraulic cylinder is associated with each mold. The known machines have been so constructed that the pressure fluid is introduced into each cylinder as it arrived at a fixed feed station during the rotation of the machines. The fluid pressure in the cylinder was maintained after the cylinder had left the feeding station by the closing of a valve; the pressure was maintained until the pressing operation was finished and the finished plastic article was discharged from the mold.

These machines of the prior art suffered from many deficiencies, one of which was that the cylinder pressure could not be changed after the cylinder left the feed station. Furthermore, because of leakage, the pressure fell off to the end of the cycle. Also, it was impossible to control the cylinder so that it could be used for discharging the finished article or for retracting the mold to a fill position. Therefore, in order to bring about these last-named functions, it has been necessary to provide lever and spring mechanisms, thus adding to the cost and complexity of the machine. These and other difficulties experienced with the previously-known devices have been obviated in a novel manner by the present invention.

It is, therefore, an outstanding object of the invention to provide an apparatus for molding plastic articles in which control of the molding pressure is accomplished in a simple manner.

Another object of this invention is the provision of a plastic molding machine in which the molding pressure may be varied by predetermined amounts during a cycle of operation.

A further object of the present invention is the provision of a molding machine for use in forming articles from beads of plastic at extremely high pressure, wherein the operating cylinder may be controlled to assist in ejection of the finished article, to retract to receive new material to be formed, and to maintain the forming pressure at predetermined values during the cycle.

It is another object of the instant invention to provide an apparatus for molding plastic articles wherein the operating cylinder may be controlled for pressure, ejection, and retraction without the use of complicated mechanical devices.

It is a further object of the invention to provide a plastic molding appartus of simple, rugged construction which is capable of a long life of useful service with a minimum of maintenance.

With these and other objects in view, as will be apparent to those skilled in the art, the invention resides in the combination of parts set forth in the specification and covered by the claims appended hereto.

Figure 5:
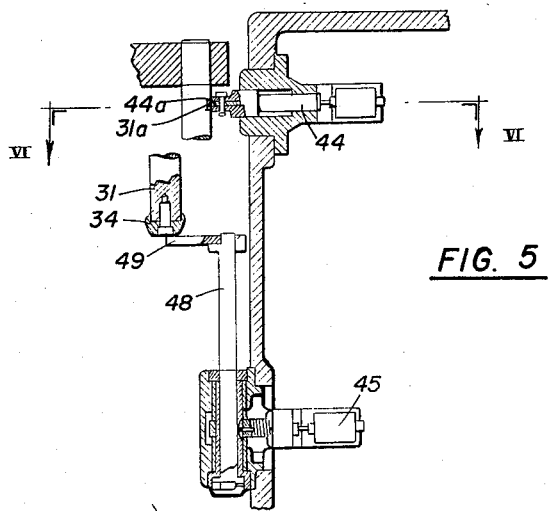
Figure 6:
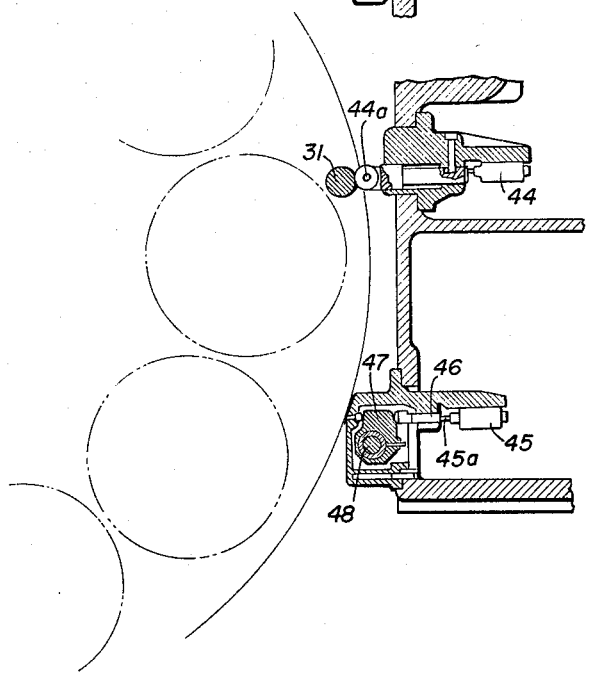

The character of the invention, however, may be best understood by reference to one of its structural forms, as illustrated by the accompanying drawings in which:

FIG. 1 is a vertical sectional view of an apparatus for molding plastic articles embodying the principles of the present invention, FIG. 2 is a somewhat enlarged vertical sectional view of the apparatus taken in the same plane as FIG. 1, but showing additional elements, FIG. 3 is a horizontal sectional view with portions broken away of the apparatus taken on the line III—III of FIG. 2, FIG. 4 is a horizontal sectional view of the invention taken on the line IV—IV of FIG. 2, FIG. 5 is a vertical sectional view of the apparatus in the same plane as FIG. 1 but showing additional elements, FIG. 6 is a horizontal sectional view of the apparatus taken on the line VI—VI of FIG. 5, and FIG. 7 is a somewhat schematic view of the hydraulic arrangement used in the apparatus.

In a general way, the advantages of the present invention can be obtained by providing for the connection of the cylinder assemblies to the source of fluid under pressure through a rotating control regulator which moves with the mold carrier. That is to say, in a conventional press in which the mold carrier rotates in a horizontal plane and is supported on a fixed vertical shaft; a control regulator is provided consisting of a pair of tubular sleeves which are concentric of the vertical shaft and rotate relative to each other. The iner sleeve is mounted on the shaft, does not rotate, and is connected to the pressure fluid source, while the outer sleeve is fixedly mounted on the mold carrier and connected to the hydraulic circuits associated with the cylinder assemblies.

Referring first to FIG. 1, wherein are best shown the general features of the invention, the apparatus, indicated generally by the reference numeral 10, is shown in use with two opposed mold halves 11 and 12. To the lower upwardly-directed mold half 12 is connected a piston 13 with an intervening piston rod 14. The piston 13 slides in a vertically-arranged cylinder 15 to form a hydraulic linear actuator or cylnder assembly. This assembly is mounted on a carrier table 16 which, in turn, is connected by tie rods 17 to an upper mold table 18. To permit clearer understanding, only one set of molds and associated cylinder assembly are shown, but it will be understood that there are many of them arranged around a common central axis. The carrier table 16 and the upper mold table 18 are rotatably mounted on a vertical shaft 20 by means of bearings 21 and 19, respectively. Mounted on the lower part of the shaft 20 is a tubular sleeve 22 which is slidably fitted in a bore 23 formed in the carrier table 16. Connected to the bottom portion of the sleeve 22 are two conduits 24 and 25 which are connected, respectively, to vertical passages 26 and 27 in the sleeve. Each passage 26 and 27 is connected to a respective corresponding passage 28 and 29 in the fixed sleeve or carrier 16. The passage 28 leads to the upper end of the cylinder 15, while the passage 29 leads to the lower end. The carrier table 16 and the associated elements are driven for rotation about the shaft 20 by a gear drive, not shown, the rotation causing movement of the cylindrical surface of the bore 13 with its passages 28 and 29 relative to the outer cylindrical surface of the fixed sleeve 22 with its passages 26 and 27.

The piston rod 14 is provided with an horizontal ear 14a to which is attached a vertical guide rod 31 which extends downwardly parallel to the rod 14. The rod 23 slides in a guide bushing 33 which is fastened to the cylinder head 32. On the lower free end of the rod 31 is provided with a striker cam 34.

Referring now to FIG. 2, a control switch 35 is mounted in the path of the striker cam 34. This switch is mounted on an adjusting rod 36 which is adjustable horizontally and vertically; the rod is mounted for vertical sliding movement in a base 37. The base is provided with a set screw 38 which engages a slot 36a in the lower end of the rod and prevents it from turning. In the base 37 is also mounted a clamping device for fixing the rod in a position of vertical adjustment. As is evident in FIG. 4, the clamping device consists of wedges 39 and 40 having an intervening screw 41 for drawing them together. The control switch 35 is mounted in a housing 42, particularly well shown in FIG. 3, which is capable of swinging movement about the upper end of the rod 36 and can be locked in a selected position by a clamping screw 43.

Referring to FIGS. 5 and 6, control switch 44 is mounted adjacent the path of the guide rod 31 and its actuating finger 44a operatively engages a slot 31a formed on the surface of the rod. Another control switch 45 is also mounted along the path of the rod 31; its actuating finger 45a is engaged by an extension 46. The extension is, in turn, moved by a lever arm 47 fixed to the lower end of a vertically pivoted rod 48 whose upper end is provided with a finger 49 which extends into the path of the striker cam 34 of the rod 31.

FIG. 7 shows the hydraulic system forming a part of the apparatus. The inner sleeve 22 is shown in conjunction with the bore 23 in the carrier table 16. The left part of the drawing shows the provision of pressure fluid to the upper ends of the cylinders 15 above the pistons 13, while the right part shows the pressure fluid leads to the lower end of the cylinders below the pistons 13. The vertical passage 26 in the inner sleeve 22 is connected to a source of high pressure fluid through the conduit 24; this passage is connected to a peripheral relief groove 50 which extends around the sleeve surface for almost 180° to alignment, on occasion, with the passage 29 leading to the underside of the piston 13. On the other hand, the passage 28 leading to the top of the cylinder makes connection, on occasion, with the passage 27 through a peripheral groove 51 on the surface of the sleeve. The passage 27 is connected through the conduit 25 to a source of relatively low pressure fluid. Other vertical passages through the sleeve can be connected, on occasion, to the passages 28 and 29 to provide the upper and lower sides of the piston 13 either with pressure fluid of various pressures or to drain.

The pistons with their cylinder casings 15 carrying the molds 12 are shown in their various stages of movement at ten stations I to X shown in part A of the diagram, the machine being observed from below. Parts C and D of the diagram show control equipment for the movement of the pistons at certain stations and for other movements (such as the discharge of formed pieces) out of the molds, as well as the turning and interlocking of the rotary mold carrier.

As shown in parts A and B of the diagram, the bottom side of piston 13 will be provided with pressure fluid delivered through the piping 60 under low pressure, while the oil removed from the other side of the piston is fed to the oil return pipe 62. In station II, the bottom side of the piston will be provided with pressure fluid delivered by a pipe 63 under high pressure. According to the invention, in the same station, the stock pressed in the mold under high pressure can be ventilated by means of a control system arranged externally of the equipment for a time to be selected. Similarly, this process will be repeated in station III.

In stations IV to VIII, the bottom side of the piston is continuously acted upon by the high pressure fluid delivered through the pipe 66, while the oil return on the other side of the piston is brought about through the pipe 62. Stations IX and X will serve to return the piston to its lowest starting position. This movement will be achieved by admission to the top sides of the pistons of low pressure fluid through the pipe 67. The oil removed from below the piston at these stations drains through the oil return pipe 68. The guide bar 31 associated with the attachment 14a of the piston rod 14 takes part in the various piston movements during rotation of the table 16 from stations I to X. Apart from its proper function regarding rotating protection of the piston 13, it controls the above-mentioned switches 35, 44, and 45 in such a manner that the temporary beginning and ending of the slow closing movement of the molds is determined by means of the control switch 35. Furthermore, the control switches 44 and 45 ensure that the molds can only be moved to the filling stations when they are open, i.e., they can only go as far as the pressing stations when they are completely closed.

Feeding of the high pressure and low pressure system will be effected by means of a low pressure pump 79 and a high pressure pump 75 shown in part D of the diagram. In parallel with the low pressure pump is a hand pump 90 which can be switched into the low pressure system through a valve. In position b a valve 92 serves as a mixer for quick filling of all pipes when putting the equipment into operation. This uses the capacity of the two pumps 75 and 79 and, while in position a, this valve will accomplish distribution of the high and low pressure fluid. Changeover of this valve 92 from position b (mixing) to position a (distributing) will be effected when the piston 13 is located in the station I with its piston rod operating the switch 93. The desired amount of pressure in the high pressure part will be adjusted by means of a valve 94. Maintenance of the adjusted operating pressure will be effected by an accumulator 95. All ten pistons 13 can be held in position and separated from the control means by the valve 96 (position b), so that only the accumulator 95 is kept under pressure. An accumulator 100 is provided for satisfactory operation of the valves 105, 106, and 107 which control pistons 101, 102, 103, and 104. This system is used in case of pressure reduction or when the pump capacity is not sufficient, since the valves and pistons control rotation of the table, filling of the molds, and discharge of the finished product. For this reason, both parts of the system are separated by a relief valve 108 arranged between the valve 105 and the pressure limit valve 109.

For the purpose of operating the press, the individual pistons 13 carrying the molds 12 will successively be brought into station I for adjustment. The closing movement will be effected through the hand pump 90 in order to avoid failure or damage to the molds. In the case of failure during an operation, the formed piece can be drawn out of the mold by putting the mold consecutively into stations IX to X and operating the hand pump 90.

In stations II and III, a control system will be effective in permitting ventilation of the stock at reduced pressure after having been pressed under high pressure in station I. The mold cover 11 will be opened for a short time by means of a cam shaft (not shown) controlled through valves 71 and 72. During this opening, the gas will be permitted to exhaust. The control system marked C in the diagram consists substantially of valves 71 and 72 operated hydraulically in the direction of the arrows with valve positions a and b as well as a metering piston 74, the lifting of which can be adjusted by means of a screw 110. This system operates in such a manner that the valve 71, when moved into position a, cuts the lower side of the piston 13 in station II from the pressure supply from the pump 75. Simultaneously, a drain is provided for the pressure fluid which is still in the high pressure side of the piston through piping 83 to the bottom side of the metering piston. The pressure fluid in the lower side of the piston 13 presses the piston to the bottom, while the metering piston 74 is lifted far enough so that the low pressure fluid delivered by the low pressure pump 79 through the pipe 76 and the valve 72 (position *a*) is fed to the high pressure side of the piston 13 through piping 83, valve 71 (position *a*), piping 84, valve 86, and piping 63. Subsequently, the piston 13 will be lifted again due to the differential action and closes the mold. Following this, the high pressure side of the piston 13 will again be provided with high pressure fluid through an electric timer by changeover of the valve 71 into position *b* after the metering piston 74 has moved into its starting position under the pressure of the low pressure fluid from the piping 76 through the valve 72 (position *a*) fed by the piping 87.

It will be the function of the two-way valves 80 and 86 to accomplish the described process first for the station II and then for the station III. Thus, the described metering control draws a certain amount of oil out of the high-pressure part of the cylinder 15 in stations II and III, which amount can be exactly determined by adjustment of the metering piston 74. This permits a partial return lift of the piston 13 for ventilation and degasification. This lift should be adjusted to correspond to the size of the previously-adjusted starting lift for the proper carrying on of the pressing process. The starting lift, however, will be the same for all stations and pistons.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is new and desired to secure by Letters Patent is:

1. Apparatus for forming plastic articles, comprising
   (a) a carrier having upper and lower tables with spaced parallel facing surfaces,
   (b) a vertical shaft on which the carrier is rotatably mounted,
   (c) a series of molds mounted on the carrier in a circle concentric of the shaft, each mold having a half mounted on each of the said table surfaces,
   (d) a hydraulic cylinder associated with each mold for moving the halves toward and away from one another,
   (e) a source of fluid pressure, and
   (f) commutation means for connecting the source to the cylinders in a predetermined manner as the carrier is rotated about the shaft, the commutation means consisting of a sleeve fixed to the shaft and concentric therewith, the sleeve having a series of passages entering at the lower edge and adapted to be connected to the source, the passages also opening on the outer surface of the sleeve, the carrier being formed with a downwardly-directed bore having a cylindrical surface which fits slidably over the outer surface of the sleeve, the carrier having passages leading to the opposite ends of the cylinders, each carrier passage opening on the said surface of the bore to coincide, on occasion, with the openings of the sleeve passages on the outer surface of the sleeve, the sleeve and the carrier passages cooperating to provide fluid at high and low pressure to the opposite ends of the cylinder and connect them to drain, on occasion.

2. Apparatus as recited in claim 1, wherein the said carrier is mounted on a fixed vertical shaft, wherein the commutation means consists of a pair of cylindrical sleeves concentric with the shaft and rotating relative to one another, one sleeve being fixedly mounted on the said shaft and connected to a source of pressure medium and the other sleeve being fixedly mounted on the carrier of the piston-cylinder assemblies and serving to connect the assemblies to the source by means of passages.

3. Apparatus as recited in claim 1, wherein the piston rod of the piston-cylinder assembly has an ear which carries a guide rod parallel to the piston axis, the guide rod sliding in a guide bushing located on the cylinder head, the guide rod having means engaging and actuating control switches for regulating the movements and status of the molds.

4. Apparatus as recited in claim 1, wherein means is provided so that during the movement from one station to another of the carrier and piston-cylinder assemblies, a venting of the material in the molds is conducted in such a way that the material which is under high pressure in a previous station is relieved of this high pressure.

5. Apparatus as recited in claim 1, wherein the pistons are supplied with pressure medium on both sides by means of a control assembly outside of the carrier and by using a pressure fluid for the low pressure and for the high pressure, so that in those stations in which high pressure medium is supplied to the underside of the pistons additional pressure medium circuits supply on the upper side of the piston with low pressure medium.

6. Apparatus as recited in claim 5, wherein the control assembly consists of hydraulically-operated valves and a measuring piston which is freely movable in a cylinder, adjustable in stroke, and operated by a valve, wherein the pressure fluid located in one side of the piston can be separated from the supply line and, by admission to the other side of low pressure, will be pressed into the adjusted cylinder space of the measuring piston, and wherein one of the valves is controlled by means operated by an electrical time-delay relay.

References Cited by the Examiner

UNITED STATES PATENTS

| | | | |
|---|---|---|---|
| 2,621,363 | 12/1952 | Fienberg et al. | 25—67 X |
| 2,728,946 | 1/1956 | Pinsenschaum | 18—20 |
| 2,937,428 | 5/1960 | Pocidalo | 25—63 X |
| 2,980,960 | 4/1961 | Cropp | 18—20 |

J. SPENCER OVERHOLSER, *Primary Examiner.*

MICHAEL V. BRINDISI, *Examiner.*

W. L. McBAY, *Assistant Examiner.*